Aug. 4, 1959 H. L. PHILIPPE 2,897,835
VACUUM BREAKER
Filed Feb. 29, 1956
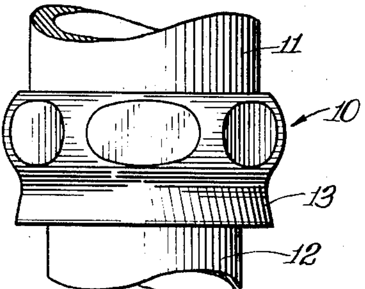
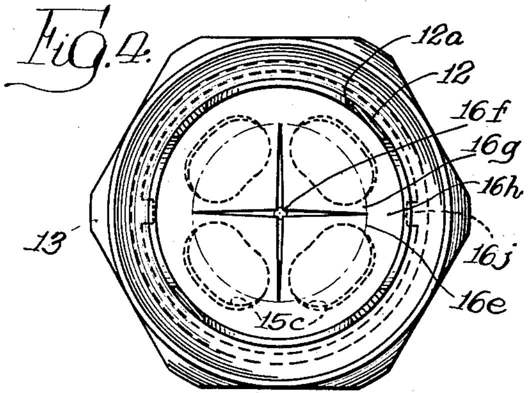
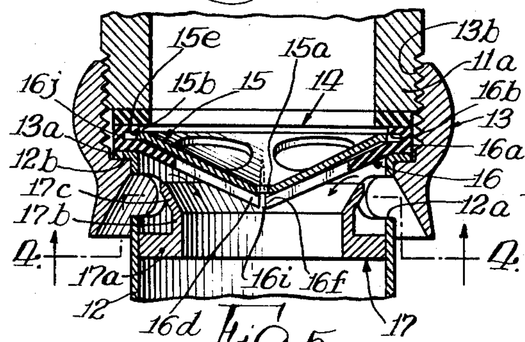
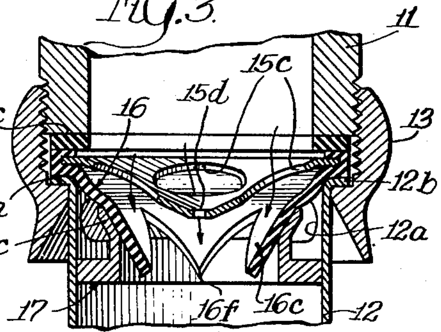
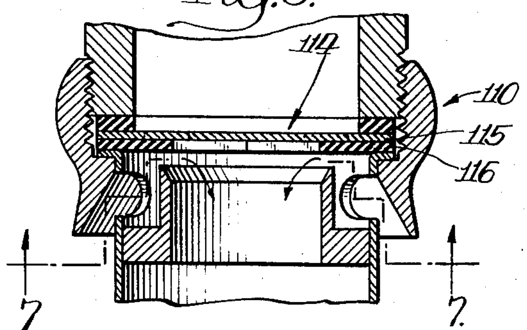
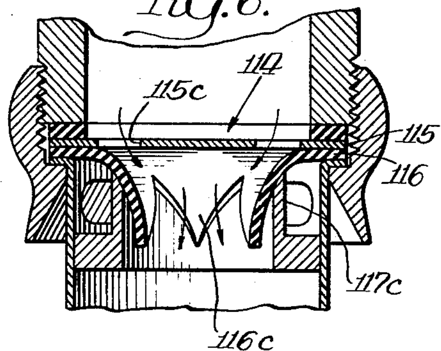
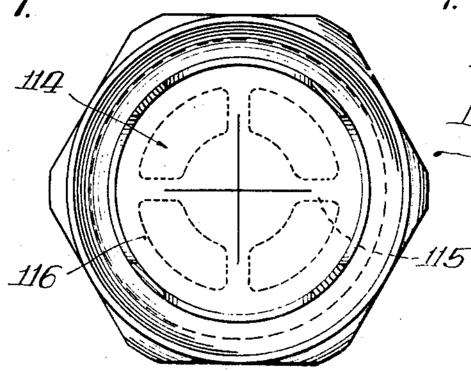
INVENTOR.
Howard L. Philippe,
BY
Schneider, Hofgren,
Brady & Wegner Att'ys.

United States Patent Office 2,897,835

Patented Aug. 4, 1959

2,897,835

VACUUM BREAKER

Howard L. Philippe, Chicago, Ill., assignor to The Imperial Brass Manufacturing Company, a corporation of Illinois Application February 29, 1956, Serial No. 568,457

6 Claims. (Cl. 137—218)

This invention relates to a vacuum breaker and in particular to a new and improved automatically operating valve for use therein.

A number of different types of vacuum breakers are presently found in the plumbing and sanitary systems art. These vacuum breakers are generally similar in that they comprise a fluid conductive duct provided with an opening to atmosphere through a wall thereof intermediate its ends. A flexible, diaphragm type, check valve is provided upstream of the opening which opens to allow water to pass in the downstream direction but closes upon attempted reverse flow thereby preventing suction acting on the upstream side of the valve from syphoning water backwardly from plumbing fixtures such as toilets and bathtubs downstream of the valve. The duct wall opening permits air to flow into the duct immediately upon the presence of any vacuum or suction pressure, thereby acting to break such vacuum and restore the undirectional water flow action of the device.

While the vacuum breakers now found in the art theoretically function as described above, a number of highly undesirable disadvantages are found therein. One such disadvantage is that sputtering (i.e., discharge of some of the water, passing through the duct, through the opening in the duct wall) occurs. This is due to failure to close the opening during the water flow period. Another disadvantage is that, after a period of use, the flexible valve diaphragms used fail to seat properly and thus do not provide a proper check valve functioning. Another disadvantage is that failure of the diaphragm often occurs due to the use therewith of a valve seat allowing relatively large unsupported areas of the diaphragm against which the vacuum and liquid flow pressures are exerted repeatedly.

The principal object of applicant's invention is to provide a new and improved vacuum breaker valve having none of the above indicated disadvantages and which is simple and economical of manufacture.

Another object is to provide such a valve having a valve seat member provided with a plurality of ports and a flexible valve element having a plurality of relatively small flaps one each in registration with each of said ports and extending over substantially less than the area of the corresponding port to provide substantial support for each flap while allowing a substantial total area of flow through the valve.

A further object of the invention is to provide a valve as described in the above paragraph for mounting in a vacuum breaker duct upstream of an opening to atmosphere through the wall thereof, with a second valve seat member downstream of the opening and extending to adjacent the flexible element whereby a downstream movement of the flexible element caused by liquid passing through the valve acts to seat the element on the second seat member and positively close the opening.

Still another object is to provide a vacuum breaker valve having a flexible diaphragm element which is biased while in the valve closed position.

A still further object is to provide such a valve as described in the above paragraph wherein the bias of the diaphragm is effected by projection of the upstream valve seat member against the diaphragm.

Other features and advantages of the invention will be apparent from the following description taken in connection with the accompanying drawings wherein:

Fig. 1 is an elevational view of a vacuum breaker embodying the invention with the ducts shown fragmentarily;

Fig. 2 is an enlarged, diametric sectional view thereof;

Fig. 3 is a diametric sectional view thereof similar to Fig. 2 but taken in a vertical plane rotated horizontally 45° from the plane of Fig. 2;

Fig. 4 is a sectional view taken approximately along the line 4—4 of Fig. 2;

Fig. 5 is a diametric sectional view of a modified form of the vacuum breaker;

Fig. 6 is a diametric sectional view thereof, similar to that of Fig. 5 except that it is taken in a vertical plane rotated horizontally 45° from the plane of Fig. 5; and Fig. 7 is a sectional view taken approximately along the line 7—7 of Fig. 5.

In the exemplary embodiment of the invention as disclosed in Figs. 1–4 of the drawings, a vacuum breaker generally designated 10 is seen to be connected to an inlet tube 11 and to comprise a fluid conductive duct including an outlet tube or duct 12 and a tube connecting means 13. Inlet tube 11 may comprise the outlet of a conventional flush type valve (not shown). At least one air admitting opening **12*a* is provided through the wall of outlet duct 12 adjacent connector 13 and valve means 14 are provided to limit the flow of water through the fluid conductive duct to a single direction and whenever water is flowing therethrough sealingly to close opening 12**.

The structure as described above is more or less conventional in vacuum breaker art. Applicant's invention relates to a new and improved form of valve means 14 described more fully here following.

Valve means 14 comprises a first valve seat member 15 extending across the fluid conductive duct upstream of opening **12*a* (the normal flow of fluid through the duct is from inlet duct 11 to outlet duct 12 and therefore upstream is in the direction toward inlet duct 11), a movable valve element 16 between valve seat member 15 and opening 12*a*, and a second valve seat member 17 downstream of opening 12*a***.

First valve seat member 15 is formed of a rigid material such as brass and is generally conical in shape. It is arranged in vacuum breaker 10 to have its apex **15*a* projecting downstream to a point laterally of opening 12*a*. The upstream end or base 15*b* of member 15 extends radially outwardly to comprise an annular flange. Intermediate the apex and base, and concentrically of the axis of member 15 is provided a plurality of ports 15*c*. While any suitable number of ports and spacing therebetween may be employed, in the presently described embodiment four such ports are provided being angularly spaced 90° one from the other. Each port is arranged to extend from adjacent base 15*b*** to adjacent apex 15*a* and thus although each port is surrounded by a substantial, laterally extending seating area, the cumulative cross sectional area of the ports may be comparable to the transverse cross sectional area of the fluid conductive duct. In this connection, it should be noted that the conicity of member 15 is important for a planer member 15 necessitates a substantial reduction of the seating areas in order to allow the cumulative cross-sectional area of the openings to be comparable to the cross-sectional area of the duct.

Movable valve element 16 comprises a flexible diaphragm generally conical in shape but having a conicity slightly less than the conicity of seat member 15 so that when member 15 is pressed into element 16, element 16 is biased slightly outwardly. The valve element may be formed of any suitable resiliently flexible material such as rubber. The base 16*a* of element 16 is formed to extend both radially outwardly and longitudinally in a direction opposite to the projection of the apex 16*b* and forms an annular flange. A radially inwardly opening, annular groove 16*b* in base 16*a* is adapted to receive flanged base 15*b* of seat member 15 to hold flexible element 16 to seat member 15 in juxtaposed relationship.

Flexible valve element 16 is provided with a plurality of flaps 16*c* arranged to register with the valve seat ports 15*c* and yieldably close the ports. In the embodiment now being described, flaps 16*c* are formed by quadrifariously slitting the apex end of the valve element from apex 16*d* thereof to a line 16*e* disposed generally medially of ports 15*c* when seat member 15 and valve element 16 are assembled in juxtaposed relationship. Thus, each flap 16*c* comprises a segmentally conical or generally triangular shaped member having a tip 16*f* normally juxtapose to apex 15*a* of first valve seat member 15 and a base portion 16*g* which, because of the flexible or yieldable nature of the material comprising valve element 16, provides a hinged connection of the flap to a frustoconical portion 16*h* of element 16 which extends downstream or toward apex 16*d* from the valve element base 16*a*. It may thus be seen that the pivotal or hinged action of the flaps 16*c* provides for a closing and opening of the inner or downstream half of the port 15*c* in registration therewith.

Means may be provided to assure proper registration of flaps 16*c* with ports 15*c* when the seat member 15 and valve element 16 are assembled. To this end lug and notch means may be employed such as diametrically opposed notches 15*e* in flange 15*b* of the first valve seat member and complementary lugs 16*j* in groove 16*b* of base 16*a* of the movable valve element.

As indicated above, because of the different conicities of the seat member 15 and valve element 16, the valve element is slightly biased in the closed position. Thus, as best seen in Fig. 2, tips 16*f* of flaps 16*c* are spaced slightly apart to define a constantly open axial passageway 16*i*. A small opening 15*d* is provided axially of valve seat member 15 through apex 15*a* to form a bleed or bypass passage which, in conjunction with passageway 16*i*, provides constant limited communication between inlet duct 11 and outlet duct 12. This serves as a means to dissipate slowly any pressure differential occurring on opposite sides of the check valve such as when a vacuum condition exists in inlet tube 11.

Means for securing the assembled seat member 15 and valve element 16 in the fluid conductive duct are provided in the form of a radially out-turned flange 12*b* at the upstream end of outlet duct 12 arranged to be received between a radial shoulder 13*a* interiorly of connector 13 and base 16*a* of the valve element 16. The upstream end 13*b* of connector 13 is interiorly threaded for engagement with an exteriorly threaded end 11*a* of inlet duct 11 whereby duct end 11*a* forces valve element base 16*a* into sealed engagement with outlet duct flange 12*b*. A suitable washer or gasket 13*c* may be interposed between duct end 11*a* and valve element base 16*a* as desired.

As indicated above, outlet duct 12 is provided adjacent its upstream end with at least one relatively large opening 12*a* (and in the embodiment being described four such openings are provided) which freely admits atmospheric air to the interior of vacuum breaker 10 whenever a vacuum condition prevails therein. It is desirable, however, to close opening 12*a* whenever water is passing through the vacuum breaker to prevent sputtering or spraying of the water outwardly through this opening while allowing immediate opening thereof when the water flow is terminated. To this end, second valve seat member 17 is provided comprising an annular member formed of a relatively rigid material such as brass. Valve seat member 17 includes a support ring 17*a* which is secured by means such as brazing or soldering to the inner wall surface of outlet duct 12 immediately downstream of opening 12*a*. Upstanding from the radially inner portion of ring 17*a* is a generally tubular seating portion 17*b* having a radially outwardly flaring end portion 17*c*. End portion 17*c* is arranged to extend generally toward flange 12*b* of the outlet duct and is arranged so that its upstream end is closer to base 16*a* of the movable valve element 16 than is the base portion 16*g* of the valve flaps 16*c*.

As flaps 16*c* cover only approximately the inner half of ports 15*c*, the remainder of the water passing through the ports is directed against frustoconical portion 16*h* of the movable valve element. As best seen in Fig. 3, the action of the water against portion 16*h* causes a flexing or yielding of portion 16*h* in a downstream direction until seating engagement is had between portion 16*h* and flared end 17*c* of valve seat member 17. Because of the unique structure of end portion 17*c* as described in the next above paragraph, the slits in movable valve element 16 do not extend beyond the edge of 17*c* when valve 16 is seated on valve seat 17 and a complete closure of opening 12*a* is effected. Thus, valve element 16 functions as a unitary annular sealing element relative to the closing of opening 12*a*, whereas it functions as a plurality of separate or individual valve elements relative to the several ports 15*c*.

In use, vacuum breaker 10, assembled as indicated above, is connected through inlet tube 11 to a water supply source (not shown) normally having a means for starting and stopping the flow of water therefrom. Outlet duct 12 is connected to any plumbing fixture such as a bathtub or toilet. These connections preferably are made so that the vacuum breaker is vertically arranged with inlet tube 11 directly above outlet duct 12. When water is passed from the supply through vacuum breaker 10 it passes through ports 15*c* and impinges on valve element 16 forcing flaps 16*c* to move from the closed position of Fig. 2 to the open position of Fig. 3. Concurrently the moving water forces frustoconical portion 16*h* downwardly into engagement with second valve seat member 17 to close outlet duct opening 12*a* and prevent any water from passing outwardly therethrough. When the flow of water through the vacuum breaker is discontinued, valve element 16 resiliently returns to the closed position of Fig. 2 where it is biased into a secure seating engagement with first valve seat member 15, thereby closing ports 15*c*. As opening 12*a* is no longer closed by the frustoconical portions 16*h* of valve element 16, the interior of outlet duct 12 is vented.

Should a vacuum pressure from any cause be developed in inlet duct 11 during flow of water through vacuum breaker 10, any reverse flow caused thereby in inlet tube 11 removes the sealing force against portion 16*h* of the movable valve member, and portion 16*h* is unseated from valve seat 17. The vacuum is thus broken by the atmospheric air resultingly admitted through the relatively large openings 12*a*. Should a vacuum pressure be developed in inlet tube 11 while no water is flowing through vacuum breaker 10, and flaps 16c are seated on member 15, the communication to atmosphere through openings 12a effectively breaks the vacuum in breaker 10 and prevents the vacuum pressure from having effect on any liquid communicating with outlet duct 12. Further, any vacuum pressure in inlet duct 11 is slowly dissipated by the limited passage of air through passageway 16i and bypass passage 15d which effect limited communication between the vented outlet duct 12 and inlet duct 11.

Any small quantity of water in inlet duct 11 subsequent to the closing of the means for starting and stopping the normal flow may slowly pass downwardly through passage 15d and passageway 16i thereby preventing the retention and stagnation of such water within inlet duct 11.

A modified form of the invention is shown in Figs. 5–7 wherein a vacuum breaker 110 is provided with a valve means 114. The structure of vacuum breaker 110 is generally similar to that of vacuum breaker 10 except that the first valve seat member 115 is planer and the correspondingly planer movable valve element 116 is held in juxtaposed relationship to member 115 without a seating bias. Flaps 116c are provided in valve element 116 which close only approximately the inner half of a plurality of ports 115c in valve seat member 115 and which function similarly to the flaps 16 of the preferred embodiment. A second valve seat member 117 is provided having a longitudinally extending end 117c in lieu of the flared end 17c of the preferred embodiment. In all other respects valve seat member 117 is similar to valve seat member 17.

Except for the biased condition of the valve element 16 when it is in the closed position, and the features attendant the use of the conical shaped members in the preferred embodiment, the functioning of the embodiment of Figs. 5–7 is generally similar to that of the preferred embodiment.

While I have shown and described certain embodiments of my invention, it is to be understood that it is capable of many modifications. Changes, therefore, in this construction and arrangement may be made without departing from the spirit and scope of the invention as defined in the appended claims.

I claim:

1. In a valve device, body means providing a passage for the flow of fluid therethrough having an inlet and an outlet, valve means spanning the passage and located intermediate the inlet and the outlet comprising: a rigid wall provided with a port and defining a valve seat circumjacent the port; and a thin, resiliently flexible wall biased into facial engagement with said rigid wall to overlie and close said port and having a pair of slits extending at an angle of less than 180° to each other from a common point adjacent said port to points spaced from opposite sides of the port, the length of said slits being such that the slits include a substantial portion but less than all of said port therebetween, the confronting edges of the flexible wall defining each of said slits being spaced apart when said flexible wall is seated on said valve seat.

2. In a valve device, body means providing a passage for the flow of fluid therethrough having an inlet and an outlet, valve means spanning the passage and located intermediate the inlet and the outlet comprising: a rigid valve seat member having a center axis, said valve seat member further having at least three ports arranged concentrically of said center axis and an annular portion outward of the ports; and a movable valve element for closing said ports, said valve element comprising a flexible member having an outer annular portion sealingly secured to said outer portion of the valve seat member and extending inwardly toward said axis to a circle extending medially of the ports concentrically of said axis, and a mid-portion provided with a plurality of slits one each between each pair of ports and extending outwardly from said axis to said circle whereby each port is closed in part by an outer portion of said mid-portion of the flexible member between the outer ends of the flanking slits and in part by an inner portion of said outer annular portion of the flexible member, the confronting edges of said flexible member defining each of said slits being spaced apart when said flexible member is seated on said valve seat member.

3. In a valve device, body means providing a passage for the flow of fluid therethrough having an inlet, an outlet and a laterally opening vent intermediate the inlet and outlet, valve means spanning the passage and located intermediate the inlet and the outlet comprising: a rigid valve seat member upstream of the vent and having a center axis, said valve seat member further having at least three ports arranged concentrically of said center axis and an annular portion outwardly of the ports; an annular valve seat coaxially spaced from the valve seat member downstream of the vent and aligned with said outer portion thereof; and a movable valve element for alternatively closing said ports and sealingly bridging the space between said outer portion and said annular valve seat to close the vent, said valve element comprising a flexible member having an outer annular portion sealingly secured to the periphery of said outer portion of the valve seat member and the body means upstream of the vent and extending inwardly toward said axis a distance at least equal to the spacing between the periphery of said outer portion of the valve seat member and said annular valve seat, and a mid-portion provided with a plurality of slits one each between each piar of ports and extending outwardly from said axis to a circle extending medially of the ports concentrically of said axis, whereby alternatively the space between said valve seat member and said annular valve seat is sealingly bridged solely by the annular portion of the flexible member and each port by a seating of said flexible member on said valve seat member is closed in part by an outer portion of said mid-portion of the flexible member between the outer ends of the flanking slits and in part by an inner portion of said outer annular portion of the flexible member.

4. In a valve device, body means providing a passage for the flow of fluid therethrough having an inlet, an outlet and a laterally opening vent intermediate the inlet and outlet, valve means spanning the passsage and located intermediate the inlet and the outlet comprising: a rigid valve seat member upstream of the vent and having a conical central portion provided with at least three ports arranged concentrically of the center axis thereof, said valve seat member further having an annular portion outward of the ports; an annular valve seat coaxially spaced from the valve seat member in the direction of narrowing of said central portion to be downstream of the vent and aligned with said outer portion thereof; and a movable valve element for alternatively closing said ports and sealingly bridging the space between said outer portion and said annular valve seat to close the vent, said valve element comprising a flexible member having an outer annular portion sealingly secured to the periphery of said outer portion of the valve seat member upstream of the vent and extending inwardly toward said axis a distance at least equal to the spacing between the periphery of said outer portion of the valve seat member and said annular valve seat, and a mid-portion biased against the central portion of the valve seat member provided with a plurality of slits one each between each pair of ports and extending outwardly from said axis to a circle extending medially of the ports concentrically of said axis, whereby alternatively each port is closed in part by an outer portion of said mid-portion of the flexible member between the outer ends of the flanking slits and in part by an inner portion of said outer annular portion of the flexible member, and said space is sealingly bridged solely by said annular portion of the flexible member.

5. The valve means of claim 4, wherein the flexible member is conical in shape and has a taper angle slightly less than the taper angle of the central portion of the rigid valve seat member.

6. The valve means of claim 4, wherein the ports face generally toward said annular valve seat, thereby to direct fluid flow directly toward said annular valve seat to impinge against and provide an improved seal of the interposed inner portion of the annular portion of the flexible member with the valve seat.

References Cited in the file of this patent

UNITED STATES PATENTS

| | | |
|---|---|---|
| 2,092,757 | Groeniger | Sept. 14, 1937 |
| 2,191,458 | Duden | Feb. 27, 1940 |
| 2,322,631 | Groeniger | June 22, 1943 |
| 2,629,393 | Langdon | Feb. 24, 1953 |
| 2,646,063 | Hayes | July 21, 1953 |
| 2,663,309 | Filliung | Dec. 22, 1953 |